Patented Feb. 18, 1941

2,232,331

UNITED STATES PATENT OFFICE 2,232,331

PROCESS OF RECOVERING HIGH-MOLECULAR ALIPHATIC CARBOXYLIC ACIDS FROM THEIR SALTS

Wolfgang Leithe, Ludwigshafen-on-the-Rhine, and Martin Luther, Mannheim, Germany, assignors, by mesne assignments, to Jasco, Incorporated, a corporation of Louisiana No Drawing. Application December 21, 1938, Serial No. 247,036. In Germany December 30, 1937

5 Claims. (Cl. 260—419)

The present invention relates to a process of recovering high-molecular weight aliphatic carboxylic acids from their salts by treating the salts with carbon dioxide.

The recovery of high molecular weight carboxylic acids from mixtures containing the same together with non-acid constituents, is usually effected by treating the mixture with substances having an alkaline reaction, separating the non-acid constituents from the salts by extraction or distillation and then precipitating the carboxylic acids from the salts with mineral acids, as for example sulphuric acid or nitric acid. There are thus formed from the salts of the carboxylic acids on the one hand and the mineral acid used for the precipitation on the other hand salts which cannot be directly used again for the recovery of salts from the carboxylic acids contained in the initial materials.

We have now found that high molecular weight aliphatic carboxylic acids can be obtained in a specially advantageous manner from their alkali and alkali earth metal salts including ammonium acid and magnesium salts by treating the salts in the presence of water, preferably under pressure and advantageously in the presence of water, with carbon dioxide and separating the carboxylic acids deposited from the bicarbonate and carbonate formed. The bicarbonate may be converted by heating into carbonate, and the effluent carbon dioxide may be compressed and used again for splitting up salts of carboxylic acids. The carbonate thus obtained may be used for the preparation of salts from mixtures containing carboxylic acids. In some cases the aqueous solution of the bicarbonate may be directly employed for the preparation of salts from mixtures containing carboxylic acids while heating. In the said manner it is possible with a limited amount of alkali metal or alkaline earth metal carbonate to convert a theoretically unlimited amount of carboxylic acids into their salts and to convert the latter again into their free acids with carbon dioxide obtained from an earlier batch during the formation of salts or from the bicarbonate.

As suitable initial materials for the process there may be mentioned for example saponification products of organic compounds containing high molecular weight aliphatic carboxylic acids or mixtures of the same with non-acid compounds, as for example saponification products of oils, fats and waxes, such as carnauba wax, montan wax, sperm oil or spermaceti, or of tall oil, or saponification products of oxidation products of high molecular weight non-aromatic hydrocarbons, as for example hard or soft paraffin wax, paraffin oil, middle oils, hydrogenation products of coals, tars or oxides of carbon. The said mixtures containing carboxylic acids are saponified in known manner, for example with sodium, potassium, ammonium, calcium or magnesium carbonate, the unsaponified constituents, as for example high molecular weight alcohols, aldehydes or ketones, then being removed in the usual manner, for example by extraction with organic solvents or by distillation, if desired under reduced pressure and while leading in steam. The salts or soaps thus obtained are decomposed in solution or suspension by treatment with carbon dioxide, whereby, depending on the alkali or alkaline earth carbonate used for the salt formation, the corresponding bicarbonate is formed, while the resulting high molecular weight carboxylic acids separate as an upper layer on the liquid or in a suspended form. It is preferable to lead in the carbon dioxide under pressure, if desired by the addition of carbon dioxide in solid or liquid form, as for example under a pressure of 5 to 100 atmospheres or even 200 atmospheres, advantageously at about 50 atmospheres. In the present process there may also be employed instead of pure carbon dioxide mixtures of gases containing besides carbon dioxide other gases, such as nitrogen, oxygen or hydrogen, which do not react with the said salts of the high-molecular aliphatic carboxylic acids.

The concentration of the salt or soap solutions or suspensions depends in general on the solubility or dispersability of the salts. It is advantageous not to work with too great a dilution in order that the working up of the bicarbonate solution formed may not be rendered difficult. Generally speaking soap solutions from 5 to 50 per cent preferably from 10 to 30 per cent strength may be employed. The leading in of the carbon dioxide is preferably effected at low temperatures, as for example at from 20° to 80° C., because in this case a higher concentration of carbon dioxide in the salt solution or suspension can be obtained and also very high pressures are not necessary. Generally speaking it is advantageous to work in aqueous solution. In many cases it may be preferable, however, to add to the solutions alcohols or other organic solvents soluble or insoluble in water, as for example methyl, ethyl, propyl, isopropyl, butyl-, isobutyl alcohol or mixtures thereof, furthermore acetone or ether, or carbon tetrachloride, di- and trichlorethylene, benzene, benzine or other fat solvents. Generally speaking the said solvents cause a still better separation of the deposited carboxylic acids from the bicarbonate and also allow of working at ordinary temperature, because the carboxylic acids formed from the salts do not separate in a solid form but in a dissolved form.

The most preferable manner of working consists in carrying out the process continuously in a circular course in the manner illustrated above.

The carboxylic acids obtained are washed with water and may be used for industrial purposes either directly or after a further purification, as for example a distillation. The bicarbonate is heated, whereby, with evolution of carbon dioxide, the carbonate is formed which may be used again for the conversion of carboxylic acids into salts while simultaneously forming carbon dioxide. The carbon dioxide separated may be compressed by pumps and again used for the decomposition of salts of carboxylic acids.

The aqueous solution of bicarbonate or carbonate obtained after removing the free fatty acids contains depending on the nature of the saponification product employed a certain amount of salts of such fatty acids the dissociation value of which under the working conditions used is higher than that of carbon dioxide, preferably of salts of low molecular, water-soluble fatty acids. These salts may be recovered from the aqueous sodium carbonate solution for example by evaporating and fractionated crystallization.

The process may also be carried out in a continuous manner for example by trickling down the soap solution in a tower filled with filling bodies such as Raschig rings while simultaneously leading in carbon dioxide in counter-current.

The said process offers special advantages in the working up of oxidation products of paraffin hydrocarbons. These contain, in addition to high molecular weight soap-forming carboxylic acids, considerable amounts of unsaponifiable constituents, as for example unchanged initial materials, and also high molecular weight alcohols, aldehydes or ketones. These mixtures are saponified and then freed from the unsaponifiable constituents, for example by extracting the alcoholic soap solutions with benzine. The soap solutions are then treated with carbon dioxide preferably under pressure. There is thus obtained an aqueous-alcoholic bicarbonate solution which may be freed from alcohol and excess carbon dioxide by evaporation and may then be used again as carbonate solution for the saponification of fresh paraffin oxidation products. The benzine-alcohol solution which contains the separated fatty acids is freed from solvent by evaporation. A crude acid is obtained which may be further purified by distillation.

A particular advantage of the present process when working up oxidation products of paraffin hydrocarbons consists in that it is possible by using special working conditions, to separate the fatty acid mixtures into single fractions by carrying out the treatment of the soaps with carbon dioxide in several stages. For example the treatment may be carried out in such a manner that only a part of the soaps present in the mixture is converted into free fatty acids, while the other part of the soaps remains unchanged. The latter are removed from the mixture by washing with water or by distilling off the free fatty acids. The remaining soaps can also be converted into the corresponding free fatty acids by treating them again with carbon dioxide while employing other working conditions, for example while using soap solutions of a lower concentration, particularly such of only 3 to 7 per cent strength, a higher pressure, for example 50 to 100 atmospheres, and lower temperatures such as from 20 to 30° C. In this manner for example it is possible to separate the fatty acids containing from about 7 to 11 carbon atoms from those containing more than 11 carbon atoms, which are particularly valuable for the preparation of soaps.

When in the treatment of concentrated aqueous salt solutions, the carboxylic acids are not completely set free from their salts, the separated carboxylic acids may again be treated with water containing carbon dioxide under pressure. The measure is advantageously carried out in counter-current in continuous operation.

The said process is also of advantage when the decomposition of the salts with carbon dioxide into free acids and bicarbonate does not take place completely by reason of the presence of salts of strong organic acids. In this case the decomposition of the salts is carried out as far as possible with carbon dioxide, the resulting bicarbonate separated and the salts which are still not decomposed are then completely decomposed with a strong acid.

The following examples will further illustrate how the said invention may be carried out in practice but the invention is not restricted to these examples. The parts are by weight.

Example 1

Carbon dioxide is led into 100 parts of a 10 per cent aqueous solution of sperm oil soaps (sodium soaps) in a pressure-tight vessel at 50° centigrade until a pressure of 50 atmospheres has been reached, the whole then being allowed to cool to 30° C. while maintaining the pressure. The aqueous sodium bicarbonate (80 parts) is then separated and the separated fatty acids are washed in the pressure vessel with 80 parts of water which is again saturated with carbon dioxide under a pressure of 50 atmospheres; the washing liquid is then withdrawn and the product again washed in the same way if necessary. The fatty acids thus obtained are practically free from soaps.

From the separated bicarbonate solution, which contains practically no soaps, a soda solution is obtained by evaporation. The washing water containing carbon dioxide is used on the counterflow principle for subsequent washing of further acids or for decomposing soaps.

Example 2

Carbon dioxide is led into 100 parts of a crude soap solution of the following composition: 17 per cent of dry soap (sodium soap), 21 per cent of benzine, 8 per cent of isobutyl alcohol and 54 per cent of water, obtainable according to the U. S. patent application Ser. No. 211,273 in a pressure vessel at 20° C. until a pressure of 50 atmospheres has been reached. The mixture is left for some time; the aqueous sodium bicarbonate solution is then separated (about 50 parts), 50 parts of water are added to the mixture and carbon dioxide is again led in until a pressure of 50 atmospheres has been reached. After separating the water, a fatty acid is obtained which is practically free from soaps. By distillation, the benzine and the isobutyl alcohol are separated. The crude acids thus obtained may be further purified, for example by distillation.

The bicarbonate solution formed is converted by heating into a soda solution which may be used in the saponification of further amounts of paraffin oxidation products.

Example 3

100 parts of a dry soap (obtained by saponification of an oxidation product of paraffin wax with caustic soda solution, removing the unsaponifiable constituents by distillation with steam) are dissolved in 600 parts of water. Into this solution at 20° C. and under normal pressure carbon dioxide is led in while intensely stirring until the solution is saturated. The foaming mixture is then separated by treating it in a centrifuge in 600 parts of a clear, aqueous solution and 100 parts of a paste. The latter contains, besides a small amount of water, the whole amount of the high-molecular fatty acids contained in the saponification product, one-half of it consisting of free fatty acids and the other half of unchanged soaps. The splitting of the soaps is completed by adding sulphuric acid until reaction towards Congo-red dyestuff takes place.

In this manner only one-third of the amount of sulphuric acid is necessary as it is required for completely converting 100 parts of the same soap into free acids.

The aqueous solution obtained in the first step after removing the paste containing the fatty acids contains sodium bicarbonate and sodium salts of low-molecular fatty acids; it may be worked up in the manner described above.

Example 4

A paraffin wax (melting point 39° C.) obtained by treating resweated foots oil (resulting in working up the paraffin distillation product of mineral oil) with halogen containing fat solvents is subjected to the destructive oxidation with air at a temperature of 110° C., while adding 0.18 per cent of potassium permanganate. After an oxidation period of 21 hours a product is obtained which contains 66 per cent of unsaponifiable constituents and which possesses an acid value of 63 and a saponification value of 114. This product is saponified while vigorously stirring for 1 hour at 250° C. with an amount of 15 per cent soda solution exceeding the amount theoretically required by about 5 per cent. The bulk of carbon dioxide is previously removed from the reaction mixture by stirring it at about 90° C. and for about 15 minutes. In the following further saponification under elevated pressure the carbon dioxide which is disengaged as the saponification proceeds is removed by releasing intermittently or continuously the pressure which exceeds the steam pressure.

The soap contained in the saponification product is freed of unsaponifiable constituents either by extraction with solvents or by distillation. The soap solution is freed from solvents (when subjected to the said solvent extraction) and brought to a content of about 10 per cent of dry soap by diluting with water. Into the solution, which is charged into an autoclave carbon dioxide is led in at a temperature of 40° C. and under a pressure of 50 atmospheres while intensely stirring until saturation has occurred. After about 6 hours standing 2 layers are formed, an upper layer which mainly consists of fatty acids, and a lower aqueous layer which contains sodium bicarbonate, sodium carbonate and the sodium salts of the low molecular fatty acids which under the prevailing conditions has a greater dissociation constant than carbon dioxide.

The separation of the sodium salts of the low molecular fatty acids contained in the lower aqueous layer from sodium bicarbonate or sodium carbonate is achieved by evaporating the water, carbon dioxide being recovered by decomposition of the bicarbonate which is again employed for the hydrolytic splitting of fresh soap solutions. During the evaporation of the water soda by reason of its heavy solubility in water is separated first; it can be recovered and used for further saponification of fresh oxidation products. The remaining aqueous solution contains the sodium salts of the lower molecular fatty acids besides a small amount of soda from which the said fatty acids may be recovered by acidifying with acids, for example sulphuric acid, hydrochloric acid or nitric acid.

The fatty acid layer contains about 12 per cent soap from which it is freed by washing with water. The fatty acids are then subjected to a distillation in vacuo while simultaneously introducing wet steam or other atomized organic liquids. Thus an excellent starting material for the preparation of toilet soaps or soaps for household purposes is obtained. Due to the absence even of traces of fatty acids of a middle or low molecular weight the fatty acids obtained in the manner as described above are practically odorless.

The soaps removed from the fatty acid layer for the purpose of recovering the fatty acids are either treated with mineral acid, for example sulphuric acid, hydrochloric acid or nitric acid, or subjected in the form of a 5 per cent soap solution under a pressure of 30 atmospheres and at a temperature of 30° C. to a further treatment with carbon dioxide. The fatty acid layer obtained contains only about 1 per cent of soap.

What we claim is:

1. The process of recovering high-molecular aliphatic carboxylic acids from their salts which comprises treating a salt of a high-molecular aliphatic carboxylic acid and an alkali metal in the presence of water with carbon dioxide and separating the deposited carboxylic acid from the aqueous solution.

2. The process of recovering high-molecular aliphatic carboxylic acids from their salts which comprises treating a salt of a high-molecular aliphatic carboxylic acid and an alkali metal in the presence of water with carbon dioxide under superatmospheric pressure and separating the deposited carboxylic acid from the aqueous solution.

3. The process of recovering high-molecular aliphatic carboxylic acids from their salts which comprises treating a salt of a high-molecular aliphatic carboxylic acid and an alkali metal in the presence of water with carbon dioxide and separating the deposited carboxylic acid from the aqueous solution, converting the bicarbonate into carbonate by heating and then using the resulting carbonate for the preparation of salts from high-molecular aliphatic carboxylic acids.

4. The process of recovering high-molecular aliphatic carboxylic acids from their salts in a circular process which comprises treating a salt of a high-molecular aliphatic carboxylic acid and an alkali metal in the presence of water with carbon dioxide and separating the deposited carboxylic acid from the aqueous solution, converting the bicarbonate into carbonate by heating and using the resulting carbonate for the preparation of salts from high-molecular aliphatic carboxylic acids, while using the carbon dioxide set free from the carbonate in the preparation of the salts of the carboxylic acids and the carbon dioxide recovered by heating the bicarbonate for splitting the salts of carboxylic acids.

5. The process of recovering high-molecular aliphatic carboxylic acids from their salts which comprises treating a mixture of salts of high-molecular aliphatic carboxylic acids and alkali metals in the presence of water with carbon dioxide under such working conditions that only a part of the salts is converted into free fatty acids, separating the deposited fatty acids from the solution and treating the latter again with carbon dioxide under stronger working conditions, thus converting the remaining salts of fatty acids into free acids.

WOLFGANG LEITHE.
MARTIN LUTHER.